United States Patent [19]
Dupont

[11] Patent Number: 5,548,598
[45] Date of Patent: Aug. 20, 1996

[54] IN A DATA COMMUNICATIONS SYSTEMS A METHOD OF FORWARD ERROR CORRECTION

[75] Inventor: Pierre Dupont, Whistler, Canada

[73] Assignee: Motorola, Schaumburg, Ill.

[21] Appl. No.: 218,401

[22] Filed: Mar. 28, 1994

[51] Int. Cl.$^6$ .................................. H04L 1/00; H04L 1/16
[52] U.S. Cl. ............................................ 371/35; 371/37.7
[58] Field of Search ................................. 371/35, 32, 33, 371/37.1, 37.7

[56] References Cited

U.S. PATENT DOCUMENTS 4,584,685  4/1986  Gajjar ........................................ 371/35

OTHER PUBLICATIONS

Chase, D., "Code Combining–A Maximum Likelihood Decoding Approach for Combining an Arbitrary Number of Noisy Packets", IEEE Trans. on Comm., vol. COM-33, No. 5, May 1985, pp. 385–393.

Wicker, S., "Adaptive Rate Error Control Through the Use of Diversity Combining and Majority–Logic Decoding in a Hybrid–ARQ Protocol", IEEE Trans. on Comm., vol. 39, No. 3, Mar. 1991, pp. 380–385.

*Primary Examiner*—Stephen M. Baker
*Attorney, Agent, or Firm*—Kevin A. Buford

[57] ABSTRACT

An improved method of forward error correction in a data communications system that includes receiving a data frame that includes a filler symbol, detecting an error in the data frame, replacing the filler symbol with a predetermined symbol, and determining when the error has been corrected. Detecting the error includes performing a first parity check, preferably a CRC computation that is repeated a second time, after replacing the filler symbol, to determine when the error has been corrected. When replacing the filler symbol(s) has corrected the error, an automatic retry request may be foregone thus conserving channel capacity.

17 Claims, 2 Drawing Sheets

5,548,598

IN A DATA COMMUNICATIONS SYSTEMS A METHOD OF FORWARD ERROR CORRECTION

FIELD OF THE INVENTION

The instant disclosure deals with forward error correction and more specifically but not limited to a method of improving forward error correction for communications systems.

BACKGROUND OF THE INVENTION

Communications systems necessarily utilize communication channels. These channels are non ideal, band width limited paths over which information must be communicated or transported. These channels impose limits on the amount of information that may be communicated in a unit time. Such a limit may be referred to as a channel capacity. The channel capacity together with other properties of the channel, such as various forms of noise interference, will, with statistical certainty, cause or otherwise result in the occurrence of errors in the information that is communicated over the channel. These effects may be particularly evident on wireless channels such as those utilized by wireless communications systems, particularly wireless data communications systems. Practitioners in the art have long recognized these phenomenon and have with varying degrees of success developed approaches to deal with the effects of a non ideal channel.

Some of these approaches include forward error correction (FEC) and backward error correction (BEC). FEC includes techniques, such as various forms of encoding or redundancy or duplication of the information as transmitted, directed to assuring that the correct information may be recovered, regardless of whether an error occurred, during or as a result of communication over the channel. In contrast BEC includes techniques, such as Automatic transmission Retry reQuest (ARQ) or various acknowledgment protocols, directed to assuring that correct information is ultimately made available whenever an error has occurred. In any event most all forms of FEC and especially BEC require a portion of the channel capacity and thus detract, at least in theory, from the amount of information that otherwise may be transported over the channel. Clearly a need exists for a method of forward error correction that minimizes the impact on channel capacity.

BRIEF DESCRIPTION OF THE DRAWINGS

The features of the present invention which are believed to be novel are set forth with particularity in the appended claims. However, the invention together with further advantages thereof, may best be understood by reference to the accompanying drawings in which:

DETAILED DESCRIPTION OF A PREFERRED EMBODIMENT

Generally, and as an overview the instant invention deals with a method of providing forward error correction in a data communications system. This method includes receiving a data frame, which data frame further includes one or more filler symbol, detecting an error in the data frame, replacing the filler symbol with a predetermined symbol, and then determining when the error has been corrected. In a further embodiment, if the error was not corrected a transmission retry may be requested and when the error has been corrected such a retry request may be foregone. The process of detecting an error may include calculating a cyclical redundancy check (CRC) code check sum. In still another embodiment a transmission retry may be requested when the error has not been corrected and the data frame may be acknowledged when the error has been corrected. In this embodiment the process of detecting an error may include calculating or performing a first parity check and calculating a cyclical redundancy check (CRC) code check sum.

Figure 1:
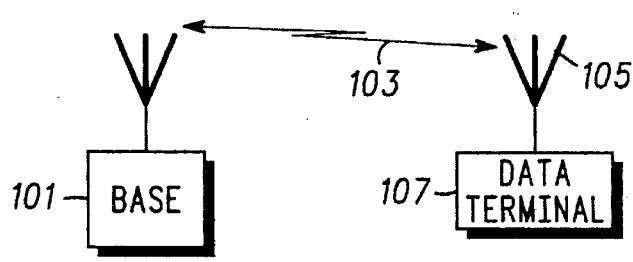
FIG. 1 is a block diagram of a wireless communications system suited for utilization of an embodiment of the instant invention.

An understanding of the invention will be furthered by a detailed explanation made with reference to the figures in which FIG. 1 is a block diagram of a wireless communications system arranged to operate in accordance with a preferred embodiment of the instant invention. In FIG. 1 a base station (101) is depicted communicating over a channel (103) with an antenna (105) of a data terminal (107). While only one base station and data terminal and channel has been depicted it will be clear to those skilled in the art that the instant invention applies to more complex systems including a multiplicity of base stations, data terminals or channels. The channel (103) will have an associated radio frequency on which data information will be carried in the form of modulation of a radio wave.

Figure 2:
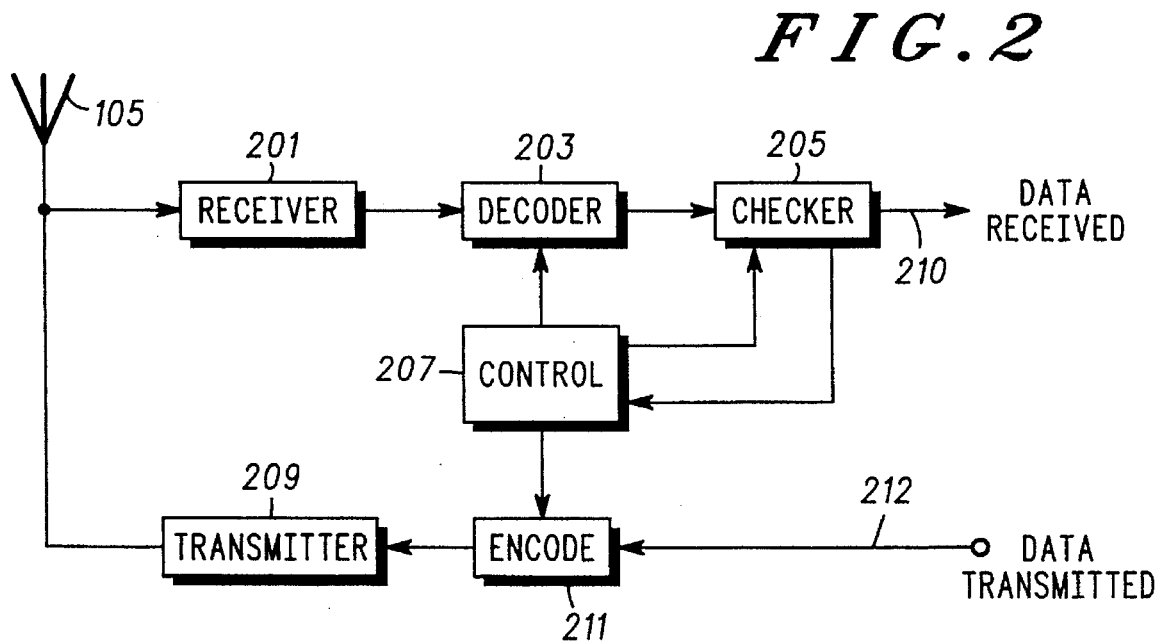
FIG. 2 is a block diagram of a data terminal adapted for deployment in the FIG. 1 system.

Referring now to FIG. 2 where like elements from FIG. 1 are designated by like reference numerals, a block diagram of the data terminal (107) is depicted again coupled to the antenna (105). Here the antenna (105) is shown coupled to a receiver (201) and a transmitter (209). The receiver (201) is coupled to a decoder (203) and the decoder (203) is coupled to a checker (205). A controller (207) is coupled to and arranged and constructed to control the decoder (203), the checker (205), and an encoder (211). The encoder (211) is coupled to the transmitter (209). As an overview in operation the data terminal (107) of FIG. 2 is tuned to the radio frequency of the channel (103) and receives and decodes data that will be provided at an output (210) of the checker (205). Alternatively, data, available at an input (212) of the encoder (211), is encoded and coupled to the transmitter (209) for transmission on the radio frequency of channel (103). While the functional elements depicted in FIG. 2 are generally known the reader is referred to Motorola Technical Manual titled RPM 405i Radio Packet Modem designated 68P04010C70 for further detailed information regarding such elements.

Figure 3:
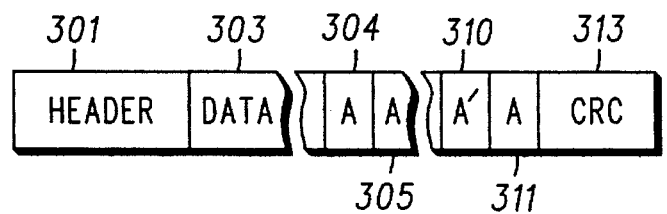
FIG. 3 is an exemplary data frame advantageously arranged to use an embodiment of the instant invention.

Referring to FIG. 3 a typical data frame, such as defined by Motorola's RDLAP (radio data link access procedure), may consist of a header (301), a data portion (303), a filler portion (304, 305, - - - 311), and a CRC field (313). The data frame structure is usually applied to data communications systems to facilitate various error correcting protocols or otherwise manage the overheads associated with data transport. Generally the data packet will be a fixed length or possibly one of a small number of fixed lengths. The particular structure of the frame will depend on the protocol utilized by the system for transport over the channel (103).

The header (301) may contain addressing for either the destination or origination units, such data terminal (107) and base (101), control and format information, such as the type of frame, the frame sequence number, and the number of data and filler symbols within the frame. The data portion (303) is ordinarily of variable length, subject to an overall constraint for data frame. A variable number of filler symbols (304, 305,- - - 311), equivalent to the frame constraint less the length or amount of the data portion (303), follow the data portion. All filler symbols are predetermined symbols, such as alternating 1010 binary patterns, typically defined by the protocol and depicted in FIG. 3 as A (304, 305). A incorrect filler symbol (310) incorrectly received due to a transmission error is depicted as A' (311). The cyclic redundancy check (CRC) field (313) contains a CRC code that is calculated, according to well known techniques, using the frame header (301), data portion (303), and filler portions of the data frame.

Under normal system operation, the controller (207) arbitrates between the receiver (201) and the transmitter (209), alternating between there respective receive or transmit communications functions as required by the protocol. When the receiver (201) is active or receiving, radio waves picked up by the antenna (105), are passed to the receiver (201) for demodulation into data symbols. The symbols are transferred to the decoder (203) which performs FEC decoding, removes any other redundancy, and corrects, within the limits of the error coding, for transmission errors. The output of the decoder (203), a data frame as represented in FIG. 3, is transferred to the checker (205). Thus the receiver (201) together with the decoder (203) operates to receive a data frame that includes one or more filler symbols. The checker (205) calculates a first parity check, for example a CRC code, which is compared to an expected parity check, for example the received CRC code contained within the CRC field (313), to determine if the frame contains any additional un-corrected errors. If the frame is error free, it is accepted and passed on, at out-put (210), for further processing. When the data frame contains an error as indicated by the first parity check, the controller (207) directs the checker to attempt further error correction as further explained below.

In summary any suspected incorrect filler symbol such as the symbol A' (310) is replaced with the predetermined symbol, here A, to provide a revised data frame. The checker (205) then performs a second parity check, for example a second CRC check, on the revised data frame. The checker (205) next determines when the second parity check, specifically CRC check, indicates an error in the revised data frame by again comparing the second CRC to the received CRC code contained within the CRC field (313). If the revised data frame does not include any errors, it is accepted and passed on for further processing. If the revised data frame is still found to contain un-corrected errors, the data frame is rejected. The controller (207) may generate a re transmission request which is passed to the encoder (211).

Figure 4:
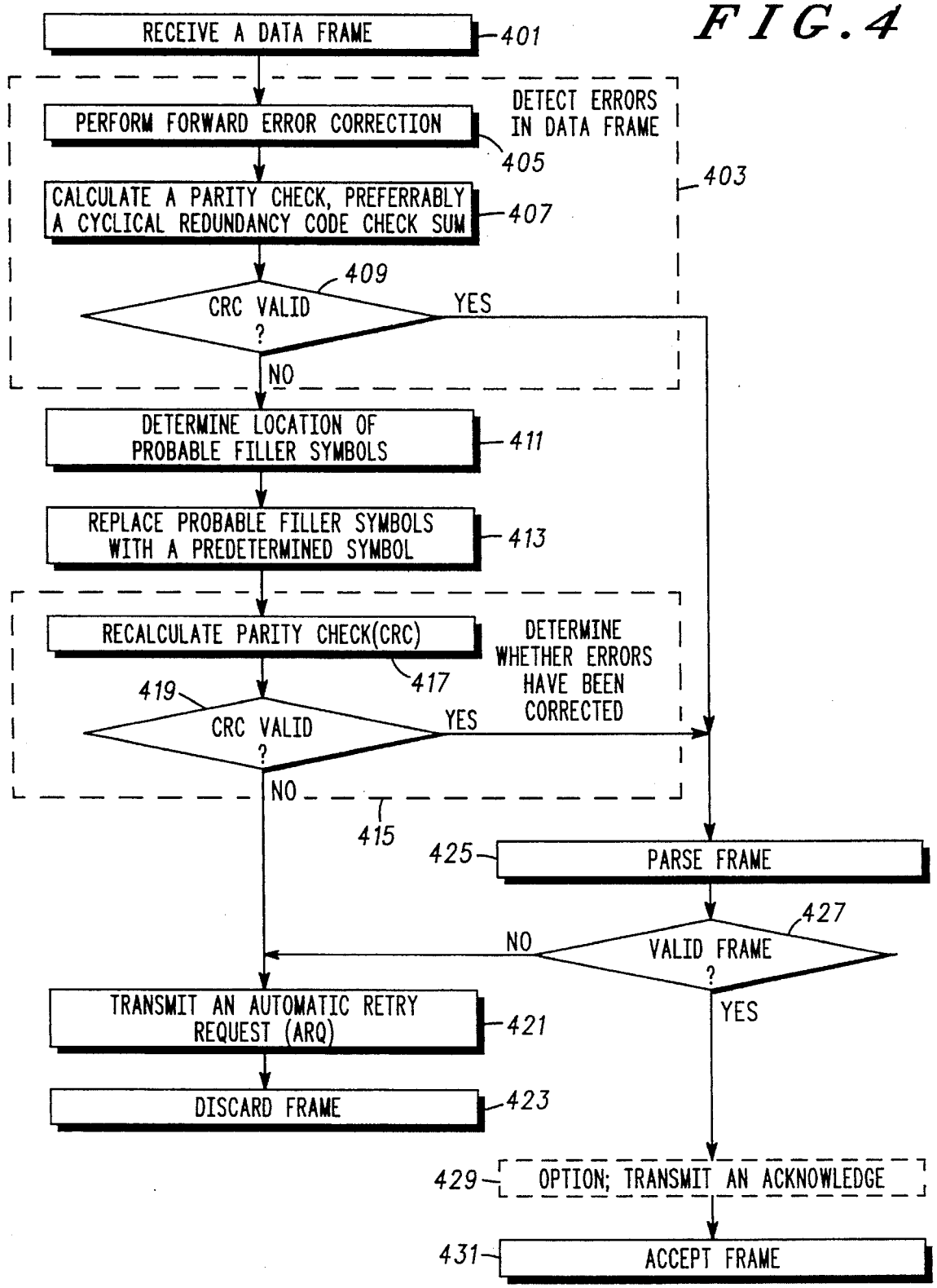
FIG. 4 is a flow chart in accordance with a preferred method embodiment of the instant invention.

Referring to the FIG. 4 flow chart a preferred embodiment of the instant invention directed to an improved method of forward error correction in a data communications system having error correction begins at step (401). Initially a complete data frame including one or more filler symbols is received at step (401). Errors within this data frame are then detected at step (403). In the preferred embodiment step (403) is accomplished by performing all forward error correction (FEC), if any, inherent in the protocol at step (405). Step (405) will correct as many transmission errors as possible for the particular FEC techniques employed. A first parity check on the data frame is then performed at step (407), preferably by computing the cyclic redundancy check code, and at step (409) determining when or whether this computed CRC is valid by comparing it to the CRC code in the data frame's CRC field (313).

If the CRC code in the CRC field (313) is equivalent to the computed CRC then the data frame contains no transmission errors and the process proceeds to step (425). Otherwise the data frame is assumed to contain one or more un-corrected transmission errors and the process continues to step (411) where the data frame is examined to determine the positions of filler symbols, more specifically probable filler symbols. The frame header (301) may provide this information or alternatively an examination of frame contents, looking for, for example, the predetermined filler symbol A (305) followed by a variation from this symbol A' (310), may reveal the location of probable filler symbols.

Having determined the location of the filler symbols, The filler symbols or the contents of the probable locations of the filler symbols are replaced with the predetermined symbol that represents a filler symbol to provide a revised data frame at step (413). Then step (415) is executed to determine when or whether the error in the revised data frame has been corrected. In step 415, initially a second parity check on the revised data frame is performed by, preferably, re-computing the cyclic redundancy check code at step (417). Then, at step (419), determining when or whether this CRC is valid by comparing it to the CRC in the CRC field (313). When this CRC is not valid and thus the second parity check indicates an error in the revised data frame the original and revised data frame is considered invalid and processing proceeds to step (421). Otherwise, when the second parity check indicates all errors have been corrected, the revised data frame is presumed valid and the process proceeds to step (425).

At step (421) an automatic retry request (ARQ) is transmitted. This is an indication to the base (101) that the data frame was not correctly received by the data terminal (107) and that the base (101) should re transmit the data frame. The invalid data frame is then discarded at step (423) and the re-transmitted data frame may be received at step (401). Alternative in step (425), whenever the original data frame as indicated at step (409) or the revised data frame as indicated at step (419) does not have errors the relevant data frame is parsed, at step (425), to extract the header contents such as the frame sequence number, format information, and various protocol elements. In step (427), all such elements or parameters are checked for validity. Frames which do not conform to the transmission protocol cause the process to proceed to step (421) and those Data frames which pass the protocol validity checks result in the process proceeding to step (429).

At step (429), an optional data frame acknowledgment (ACK) may be transmitted by the data terminal (107) to the base (101) and the relevant data frame is accepted as valid at step (431). In this fashion requesting a transmission retry occurs only when the second parity check indicates an error. Otherwise, when the second parity check does not indicate an error in the revised data frame, such a request is foregone thus advantageously reducing the degree of the channel capacity that may ordinarily be used to correct erroneously received filler symbols.

It will be appreciated by those of ordinary skill in the art that the apparatus and methods disclosed provide a method for accomplishing improved forward error correction without using valuable channel capacity and otherwise un-necessarily increasing data transmission delays. These inventive methods may be advantageously deployed in a wireless packet data or other communications device or system to provide forward error correction. Thus, the present invention satisfies a long-felt need of wireless data communications by providing an exemplary form of forward error correction that does not use additional channel capacity.

It will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. In a data communications system having error correction an improved method of forward error correction, comprising the steps of;

receiving a data frame;

detecting an error in said data frame;

replacing a probable filler symbol of the data frame with a predetermined symbol; and determining whether said error has been corrected.

2. The method of claim 1 further comprising the step of requesting a transmission retry when said error has not been corrected and foregoing said requesting a transmission retry when said error has been corrected.

3. The method of claim 1 further comprising, prior to the step of detecting an error, the step of performing a forward error correction of the data frame.

4. The method of claim 1 wherein said step of determining whether said error has been corrected comprises performing a parity check.

5. The method of claim 1 wherein said step of replacing comprises determining the probable location of filler symbols in the data frame, and replacing each symbol of the probable location, including said probable filler symbol, with the predetermined symbol, wherein the predetermined symbol represents a filler symbol.

6. The method of claim 1 wherein said detecting an error comprises performing a parity check.

7. The method of claim 6 wherein said detecting an error comprises calculating a cyclical redundancy check (CRC) code check sum.

8. In a wireless data communications system, an improved method of forward error correction comprising:

receiving a data frame;

performing a first parity check on said data frame;

replacing a probable filler symbol of the data frame with a predetermined symbol to provide a revised data frame when said first parity check indicates an error in said data frame; and performing a second parity check on said revised data frame to determine whether said second parity check is indicative of an error in said revised data frame.

9. The method of claim 8 further comprising the step of requesting a transmission retry when said second parity check is indicative of an error and foregoing said requesting a transmission retry when said second parity check does not indicate an error in said revised data frame.

10. The method of claim 8 wherein said first parity check comprises calculating a cyclical redundancy check (CRC) code check sum.

11. The method of claim 8 further comprising the step of requesting a transmission retry when said second parity check indicates an error and acknowledging said data frame when said second parity check does not indicate an error in said revised data frame.

12. The method of claim 11 wherein said first parity check comprises calculating a cyclical redundancy check (CRC) code check sum.

13. A data unit comprising:

a receiver operable for receiving a data frame; and an error detector coupled to the receiver and operable for detecting when an error is present in said data frame and replacing a probable filler symbol of the data frame with a predetermined symbol.

14. The data unit of claim 13, further comprising:

a decoder, coupled between the receiver and error detector, operable for receiving the data frame from the receiver, performing a forward error correction of the data frame, and providing the forward error corrected data frame to the error detector.

15. The data unit of claim 13, wherein the error detector is operable for detecting when an error is present by performing a parity check.

16. The data unit of claim 13, wherein the error detector is operable for determining the probable location of filler symbols in the data frame, and replacing each symbol of the probable location, including said probable filler symbol, with the predetermined symbol, wherein the predetermined symbol represents a filler symbol.

17. The data unit of claim 16, further comprising a controller coupled to the error detector operable, in response to an indication from the error detector that an error is present in the data frame in which the probable symbol has been replaced by the predetermined symbol, for generating a re-transmission request.

* * * * *